March 26, 1957 YOSHIMITSU OISHI 2,786,636
APPARATUS FOR RECLAIMING RUBBER MATERIAL
Filed March 29, 1955 2 Sheets-Sheet 1

United States Patent Office 2,786,636
Patented Mar. 26, 1957

2,786,636

APPARATUS FOR RECLAIMING RUBBER MATERIAL

Yoshimitsu Oishi, Shioya-gun Tochigi-ken, Japan, assignor to Muraoka Rubber Reclaiming Co., Ltd., Ichikawa-Machi, Chibaken, Japan Application March 29, 1955, Serial No. 497,737

4 Claims. (Cl. 241—79)

The present invention relates to apparatus for reclaiming scrap rubber and particularly to apparatus for separating the fiber and the rubber from rubber scrap such as tire casings. The term "rubber" is used in a generic sense to include artificial as well as natural rubber.

The present invention relates to apparatus of the type disclosed in my prior patent, No. 2,686,011, and in my copending application S. N. 497,515.

It is an object of the present invention to provide simple, efficient apparatus for separating the fiber and the rubber of vulcanized rubber scrap in such a manner that a substantially complete separation is obtained whereby a high grade of reclaimed rubber is produced.

Other objects and advantages of the present invention will become apparent from the following description and the accompanying drawings, in which.

Figure 1:
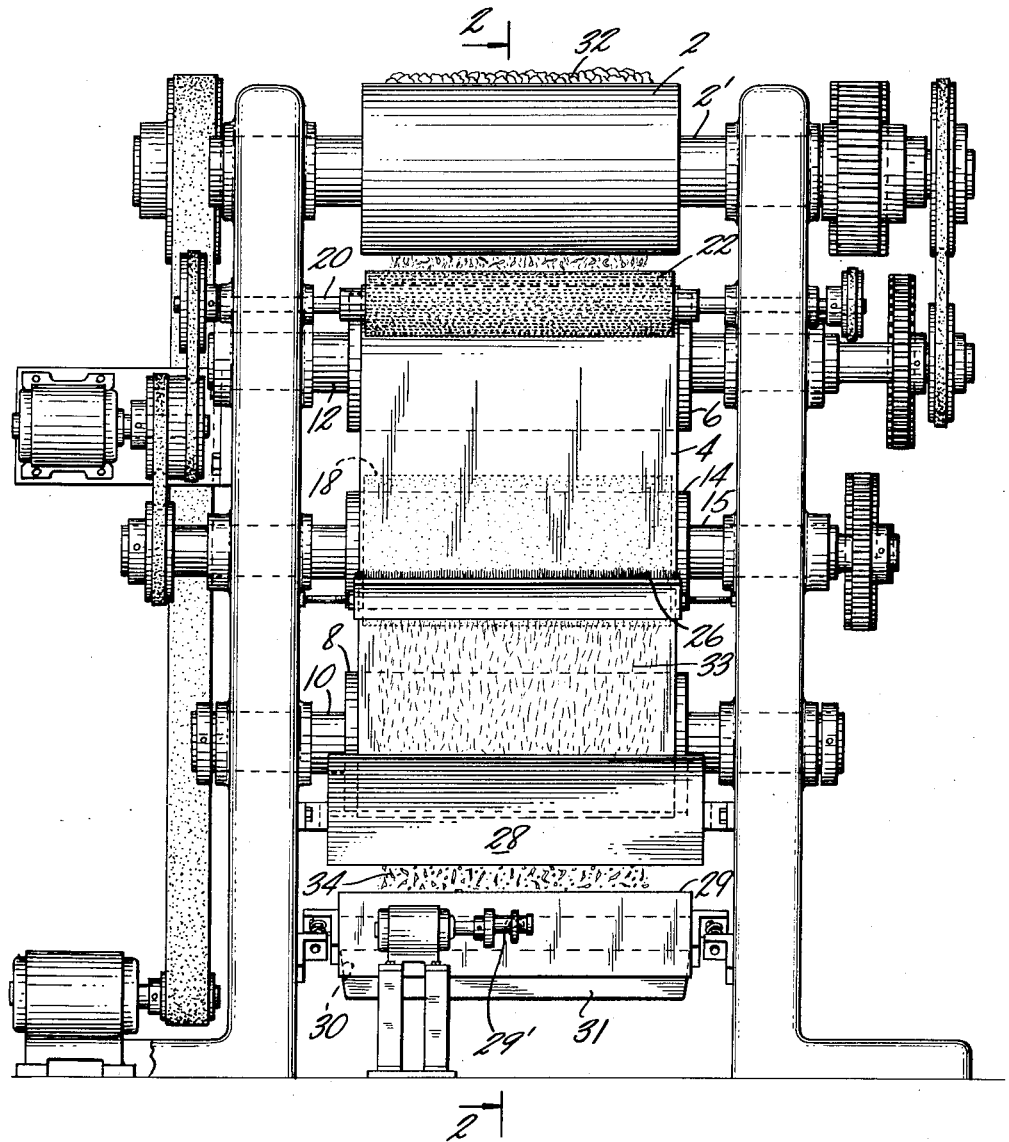
Fig. 1 is a side elevation of an apparatus embodying the present invention.
Figure 2:
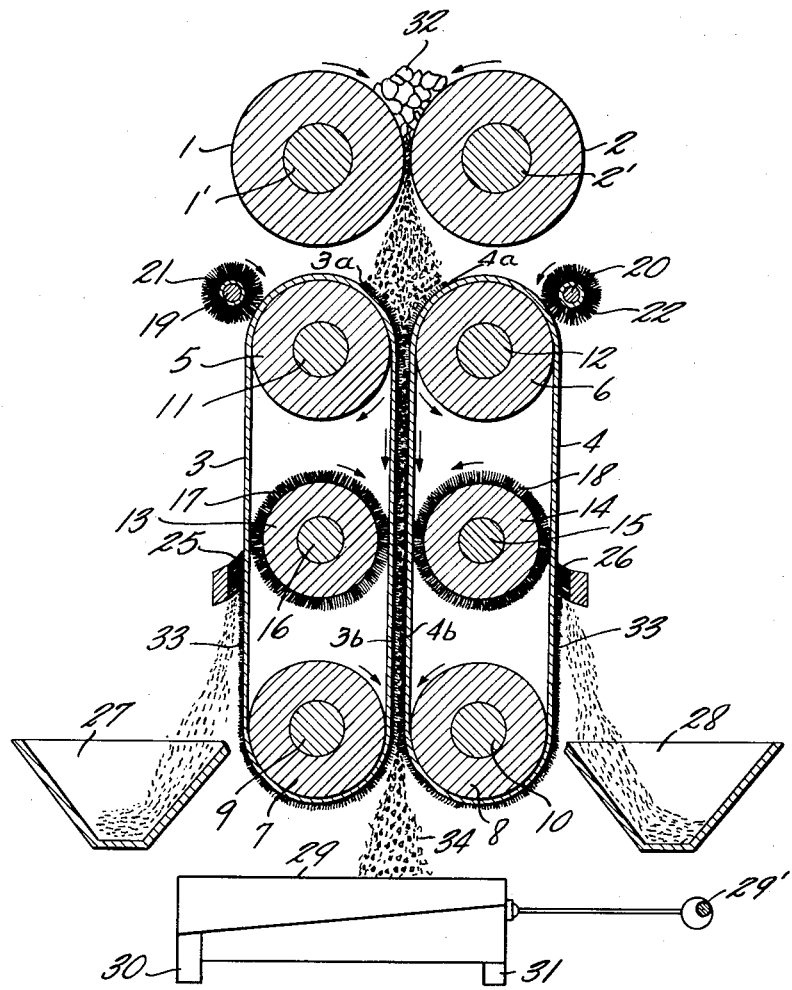
Fig. 2 is a cross sectional view of the apparatus.

The apparatus shown by way of example in the drawings comprises two hard, smooth, parallel, closely spaced rolls 1 and 2. The rolls are formed of, or at least have an outer shell of, hard, wear-resistant material such as chilled steel or white pig iron and are of a suitable diameter, for example 12 to 24 inches, a diameter of about 18 inches being presently preferred. The space between the rolls is very small, for example of the order of 0.5 mm., it being understood that other spacings can be used, for example 0.25 mm. to 1 mm. The rolls 1 and 2 are arranged side by side and their axes are parallel and adapted to rotate in opposite directions so that material fed between the rolls will be discharged downwardly. Rolls 1 and 2 are mounted on shafts 1' and 2' which may be formed of an insulating material or, alternatively, the entire roll may be insulated from its support.

A pair of parallel, closely spaced, rolls 5, 6 are mounted directly beneath the rollers 1 and 2. Another pair of rollers 7 and 8 are mounted directly beneath the rollers 5 and 6 but at a considerable distance therefrom. A conveyor belt 3 is supported by the rollers 5 and 7 and a similar conveyor belt 4 is supported by the rollers 6 and 8. The belts 3 and 4 have inclined converging upper portions 3a, 4a and adjacent parallel vertical runs 3b, 4b. Means (see Fig. 1) are provided for driving at least one of the rollers associated with each belt in such a direction that the adjacent parallel vertical runs of belts 3 and 4 are driven downwardly, the direction of travel of the rollers and the belts being indicated by the arrows adjacent thereto. Rollers 5 to 8 are provided with shafts 9 to 12. Shafts 9 to 12 are preferably formed of steel while the remainder of the rollers 5 to 8 is formed of a suitable hard insulating material. It will be understood that other constructions of the rollers are possible for providing insulated rollers.

Within the belts 3 and 4, there are provided a pair of rotary brushes 13 and 14 driven in the directions indicated by the arrows adjacent thereto. These brushes are mounted on shafts 15 and 16 and are provided with bristles 17 and 18, respectively. The bristles 17 and 18 may be animal bristles, for example horsehair. Brushes 13 and 14 are arranged so that they rub against the vertical runs of the belts and particularly against the downwardly traveling adjacent runs of the belts. The purpose of brushes 13 and 14 is to produce a static electric charge on the belts 3 and 4. Another pair of rotary brushes 21 and 22 are positioned near the upper ends of the belts 3 and 4. Brushes 21 and 22 are mounted on shafts 19 and 20, respectively, and are driven in the directions indicated by the arrows adjacent thereto. Brushes 21 and 22 may likewise be formed of animal hair such as, for example, sheep's wool. Brushes 21 and 22 produce a static electric charge on the outer surfaces of belts 3 and 4.

On the outwardly traveling run of belt 3, a brush or scraper 25 is provided for removing the fiber from the belt, whereupon the fiber is collected by a receptacle 27. A similar brush or scraper 26 is pressed against the upwardly traveling run of belt 4 and removes the fiber therefrom into a receptacle 28. Below the belts 3 and 4, a sieve 29 is placed so as to receive the discharged rubber 34. The sieve 29A is provided with an outlet 30 for fine rubber particles and an outlet 31 for larger rubber particles. As the rolls 1 and 2 are turned in opposite directions, as indicated by the arrows, cut scrap rubber 32 is fed downwardly between them. The rolls 1 and 2 are driven at different peripheral speeds, the ratio of speed being preferably approximately 10 to 12. It will be understood that suitable variation in this ratio is permissible, for example 10 to 11 or as much as 10 to 15. The peripheral speed of the rolls 1 and 2 is preferably of the order of 100 to 250 feet per minute. Thus, with 18-inch rolls, the speed of rotation will be about 20 R. P. M. to 45 or 50 R. P. M., best results having been obtained with a speed of about 37 R. P. M. It will be understood that, instead of making the rolls the same size and driving them at different speeds, the rolls may be of different sizes and driven at the same or different speeds in order to provide the required ratio of peripheral speeds.

The cut rubber scrap 32 fed down between the rolls 1 and 2 is subjected to an intense crushing and rubbing action which separates the fiber in the scrap from the rubber and, at the same time, generates a high electrostatic charge by friction. The electrostatic charge on the rolls becomes so high that the rollers will glow in the dark. The particles of rubber are discharged downwardly from between rolls 1 and 2 in a diverging stream, as indicated in the drawings, but, because of the electrostatic charge, the fibers tend to cling to the rolls 1 and 2 and may be removed from the rolls 1 and 2 by any suitable means such as shown in my prior patent aforementioned.

The rubber particles and any remaining fibers discharged downwardly from the rolls 1 and 2 fall on the inclined converging upper portions of belts 3 and 4. Belts 3 and 4 are formed of any suitable insulating material such as vinyl chloride and are driven at any suitable speed, for example about 80 feet per minute. The particles falling from the rollers onto the belts is conveyed between the vertical runs to the lower end of the belts. The spacing between the adjacent runs of the belts may be 2 to 3 mm. and, if desired, it may be made adjustable to accommodate varying conditions. The fibers falling onto belts 3 and 4 are very strongly attracted thereto by virtue of the static electric charge produced on the belts by the brushes 13, 14 and 21, 22 and also by virtue of any static charge remaining on the fibers after leaving the rolls 1 and 2. The inclined converging belt portions 3a, 4a on which the material initially falls constitute a first refining zone in which fibers are attracted to the belts while the closely spaced vertical runs 3b, 4b constitute a second zone in which repeated engagement of the particles with the belts assures removal of any remaining particles. The fibers remain attracted to the belts as the belts turn through their lower bends, i. e. over the rollers 7 and 8. The fibers are then carried along the upwardly traveling run of the belts 3 and 4 and some of them may gradually lose their charge and fall into the receptacles 27 and 28. The remaining fibers on the belts are swept off by scrapers or brushes 25 and 26 pressed against the belts 3 and 4 and these fibers are collected by the receptacles 27 and 28.

It will be understood that suitable driving means are provided for the rollers and brushes. A desirable speed for brushes 13 and 14 and 21 and 22 is 1400 R. P. M. It will also be understood that various refinements which have been found desirable and which are indicated in my prior patent and copending application may be incorporated herein although, for the sake of simplicity, they have not been repeated in the present disclosure. It has, for example, been found desirable to control the temperature of rolls 1 and 2 to keep it at approximately 60° to 70° C. As the rubbing action resulting from the different peripheral speeds of the rolls 1 and 2 generates heat as well as static electricity, means are preferably provided for cooling the rolls. Such cooling means are illustrated in my aforementioned patent and it is to be understood that any suitable cooling means may be provided for the apparatus of the present invention.

It will be apparent that other additions and variations may be made without departing from the principles of my invention. Thus, while a specific embodiment of the invention has been illustrated and described, it is to be understood that the apparatus is subject to modification within the spirit of the invention and the scope of the appended claims.

What I claim and desire to secure by Letters Patent is:

1. In apparatus for reclaiming rubber material containing fiber, a pair of smooth parallel closely spaced rolls, driving means for rotating said rolls in opposite directions with their adjacent peripheral portions moving downwardly and at different peripheral speeds, cut rubber material containing fiber being fed downwardly between said rolls, the close spacing and said rotation of said rolls effecting a crushing and rubbing action on said material to separate fiber particles from rubber particles and frictionally produce an electrostatic charge on said rolls and particles, said material being discharged downwardly in a diverging stream, a pair of belts and roller means supporting and driving said belts to provide closely spaced substantially vertical parallel runs extending downwardly from the space between said rolls, the spacing of said vertical runs from one another being substantially less than the radius of said rolls, and inclined upper belt portions converging inwardly and downwardly into said vertical runs, said inclined belt portions being spaced downwardly from said rolls and disposed in said diverging stream of material discharged from said rolls in such position that a major portion of such material strikes said inclined belt portions at abrupt angles, in a primary refining zone, means for applying an electrostatic charge to said belts to attract and hold fiber particles, said rubber particles and any remaining fiber particles being discharged downwardly between said closely spaced vertical runs of said belts and thereby being subjected to repeated engagement with said belts to provide a further refining zone, means for collecting rubber particles discharged at the lower end of said vertical runs and means for removing fiber particles from said belts at zones removed from said rubber particle discharge.

2. Apparatus according to claim 1, in which the means for applying an electrostatic charge to said belts comprises rotating brushes engaging said belts and driving means for rotating said brushes.

3. Apparatus according to claim 2, in which said brushes comprise a brush engaging the outside of each belt shortly in advance of said converging portions and a brush engaging the inside of each belt in said vertical run.

4. Apparatus according to claim 1, in which the spacing of said rolls is of the order of 0.25 mm. to 1 mm. and the spacing of said vertical runs of said belts is of the order of 2 mm. to 3 mm.

References Cited in the file of this patent

UNITED STATES PATENTS

| | | |
|---|---|---|
| 254,039 | Osborne | Feb. 21, 1882 |
| 1,222,305 | Kraus | Apr. 10, 1917 |
| 2,686,011 | Oishi | Aug. 10, 1954 |